Oct. 27, 1953   L. Q. WEBBER   2,656,719
TRAVELING LINE LOAD INDICATOR
Filed Sept. 5, 1950
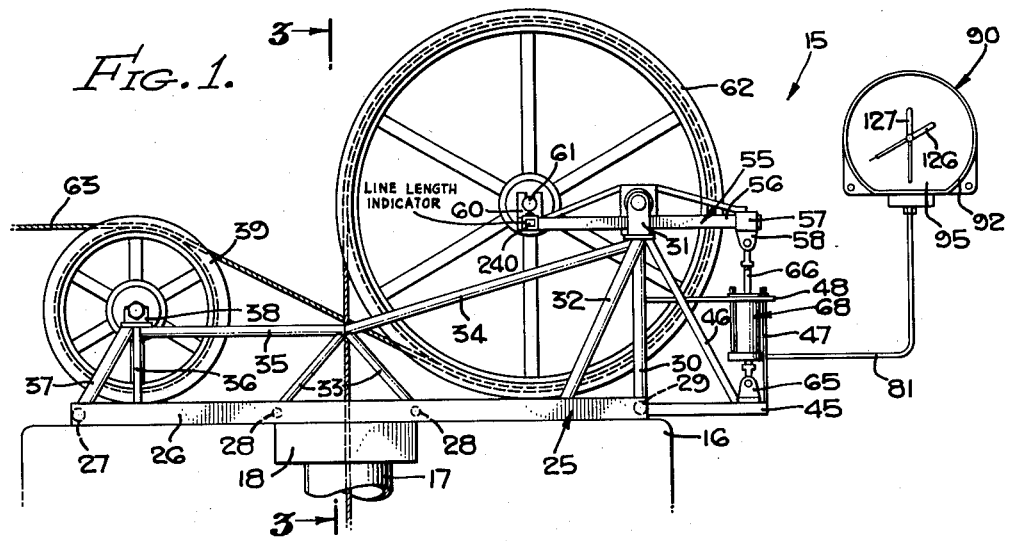
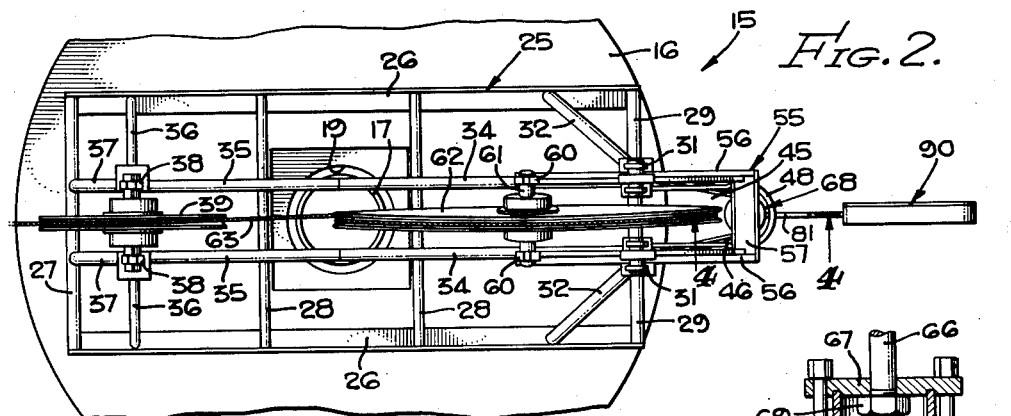
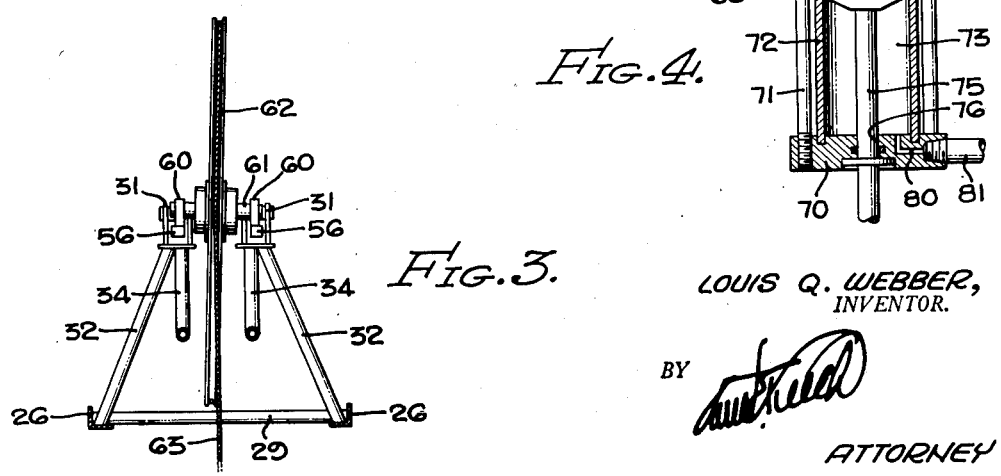
LOUIS Q. WEBBER,
INVENTOR.
BY
ATTORNEY Patented Oct. 27, 1953

2,656,719

UNITED STATES PATENT OFFICE 2,656,719

TRAVELING LINE LOAD INDICATOR

Louis Q. Webber, Long Beach, Calif., assignor to Martin-Decker Corporation, Long Beach, Calif., a corporation of Delaware Application September 5, 1950, Serial No. 183,200

1 Claim. (Cl. 73—143)

This invention relates to the use of cable in deep well or mining operations, and it relates particularly to a travelling line load indicator.

Drilling operations in deep wells are commonly carried on with tools suspended on the lower end of a length of cable supported at its upper end on the drilling rig.

Not infrequently, when hoisting the tool, the latter becomes stuck in the well and the method usually effective in freeing it is to pull upwardly at intervals on the tool through the cable by applying lifting loads to the latter of a high order.

It is, of course, important that the strain to which the line is thus subjected shall not risk breaking the line and numerous devices have been produced for informing the driller from time to time approximately what load he is imposing on the cable line so that he may keep this within safe limits.

It is an object of the present inention to provide a line load indicating device which will operate as the line travels, as when pulling the same from a well, to give a running indication of the load imposed on said line.

The manner of accomplishing the foregoing objects, as well as further objects and advantages, will be made manifest in the following description taken in connection with the accompanying drawings in which:

Fig. 1 is a diagrammatic side elevational view of a preferred embodiment of the invention installed over an oil well.

Fig. 2 is a plan view of Fig. 1.

Fig. 3 is a fragmentary vertical sectional view taken on the line 3—3 in Fig. 1.

Fig. 4 is an enlarged vertical sectional view of the hydraulic cylinder of the invention taken on line 4—4 of Fig. 2.

Referring specifically to the drawings, the invention is there shown as embodied in a travelling line load and length indicator 15, this being mounted on a derrick platform 16 of an oil well, which well is lined with a casing 17 having a casing head 18, a central opening 19 in which receives the casing 17.

The apparatus 15 has a frame 25 with angle iron members 26 originally spaced by welding opposite ends of cross pipes 27, 28 and 29 thereto. Welded in vertical parallel relation to the cross pipe 29 are fulcrum pipes 30, on the upper ends of which bearings 31 are rigidly mounted. Brace pipes 32 extend obliquely downward from the bearings 31 and are welded at their upper ends to said bearings and at their lower ends to angle irons 26

Welded in parallel spaced relation to the cross pipes 28 is a pair of inverted V-members 33 to the apices of which are welded pairs of pipes 34 and 35. Opposite ends of the pipes 34 are welded to the upper ends of fulcrum members 30. The opposite ends of pipes 35 are welded to pairs 36 and 37 of short pipes which extend obliquely downward and are welded respectively to the angle irons 26 and the cross pipe 27. Welded in place on the upper ends of the pipes 36 and 37 are bearings 38. Pivotally mounted in the bearings 38 on a horizontal axis is a flanged line guide wheel 39 which is of a relatively small diameter. The wheel 39 is so mounted that the central radial plane of said wheel is located in a vertical plane containing the axis of the casing 17.

Welded to and extending horizontally from the cross pipe 29 is a hydraulic cylinder base 45 having braces 46 which extend upward to unite with the bearings 31.

Secured to a bar 47 which extends upwardly from the base 45 and to the fulcrum members 30 is a guard rail 48.

The bearings 31 are aligned on a horizontal axis which is normal to the plane of the guide wheel 39. Pivotally mounted on said bearings 31 is a U-shaped lever 55 including side arms 56 which extend about equally in opposite directions from the bearings 31 and are connected at their outer ends by cross member 57 having a clevis 58 formed thereon and extending downwardly therefrom.

Provided on opposite ends of the arms 56 are bearings 60, these being aligned on an axis which is inclined slightly from horizontal and lies in a plane which is at right angles to the plane of the guide wheel 39. Journaling in the bearing 60 is a pivot shaft 61 of a flanged line measuring wheel 62, the diameter of which is substantially twice that of the guide wheel 39, and which is so located on the frame 25 that a cable 63 passing over the guide wheel 39 and underneath the wheel 62 and trained about the latter, depends therefrom in alignment with the axis of the well casing 17, as shown in Fig. 3. Owing to the inclination of the axis of the pivot shaft 61 of the line wheel 62, there is no conflict or rubbing between the portion of cable 63 leading from the guide wheel 39 to the line wheel 62, and the portion of said cable which depends vertically from the line wheel 62.

Provided on the base 45 is a clevis 65 which is in vertical alignment with the clevis 58. Pivotally attached to the clevis 58 and depending therefrom, is a threaded rod 66 which extends downwardly through a central aperture in upper head 67 of a hydraulic cylinder 68, and has a nut 69 on its lower end which supports said cylinder. The cylinder 68 lies just within the guard rail 48 and includes a lower head 70 which is connected to the head 67 by bolts 71, thereby clamping a tubular cylinder 72 between said heads and enclosing a fluid tight cylinder chamber 73. Slidable in this chamber is a piston 74 mounted on a piston rod 75 which extends through a central hole 76 in the head 70 and is pivotally connected to the clevis 65.

Provided in the head 70 is a liquid duct 80 which connects chamber 73 with a piece of tubing 81 which is screwed into a suitable tapped hole provided in the head 70.

The other end of tubing 81 connects with a dial gauge 90 which is mounted where it may be conveniently observed by the driller.

This gauge includes a housing 92, dial 95, and indicator hands 126 and 127 which rotate about the center of said dial to indicate weight values shown by scales provided on said dial.

Mounted on the lever 55 and driven by shaft 61 of the line wheel 62 is a line length indicator 240 which is adapted to be set to zero and thereafter counts the aggregate travel of the periphery of the line wheel 61 and the length of the line 63 passing thereover. Indicator 240 adds to the total when wheel 62 is rotating anti-clockwise and subtracts from the total when said wheel rotates clockwise.

Indicator 240 may be mounted near the dial gauge 90 if desired so that it can be read along with said gauge by the driller with a minimum of effort. In such case, indicator 240 may be connected with shaft 61 by a flexible cable (not shown).

Chamber 73 of the cylinder 68, pipe 81 and a Bourdon tube (not shown) which is provided in the gauge 90, and which actuates the dial hands 126 and 127, are filled with liquid which transmits pressure from said cylinder to said indicator.

*Operation*

After the apparatus 15 has been set up over a well, as, for instance, to lower a tool into said well, the cable 63 is fed from a power winch (not shown) on which the same is stored, over the guide wheel 63 and around the line wheel 62 as shown in Fig. 1. The tool to be lowered is attached to the end of this cable and is then lowered into the well by paying out cable from the winch. This cable rotates wheels 35 and 62 as the tool is lowered in the well. Just before the lowering of the tool into the well starts, the driller turns the line length indicator 240 to zero so that at all points in the lowering of the tool it shows the length of the cable measured from the level of the derrick platform 16 down to the level of the tool suspended thereon. At all times while the cable 63 is being lowered into or removed from the well, the weight of this and the tool fastened thereto is supported by the wheel 62. Any added strains imposed on the cable 63, such as when the tool meets resistance to its being withdrawn from the well by getting stuck in the mud therein and which is thus added to the load imposed on said cable at the top of the well, are also, of course, added to the load sustained by the wheel 62. This load at all times tends to rotate the scales lever 55 and imposes a pressure on the liquid in the cylinder 68 which varies directly with said load. This pressure is transmitted through the liquid in the pipe 81 to the liquid in the dial gauge 90 and causes a corresponding distortion of the Bourdon tube of said gauge which is reflected in movement of the dial hands 126 and 127 so that said gauge indicates the weight of the load suspended on the cable 63 at all times throughout the operation.

The claim is:

In a travelling line load indicator the combination of: a fulcrum; lever means pivotally mounted on said fulcrum; bearings provided on said lever means; a line wheel rotatably mounted in said bearings to receive a turn of said line thereabout whereby said line is adapted to depend from said wheel in a well and be supported on said wheel while travelling into or from said well; a load measuring device connected to said lever means and adapted to absorb the load imposed on said wheel by said line which tends to rotate said lever about said fulcrum, the axis of said line wheel being slightly inclined relative to horizontal; and a guide wheel for guiding said line into substantially tangential contact with a lower portion of the periphery of said line wheel, whereby said line may be passed substantially once around said line wheel and extend vertically therefrom into said well, the portion of said line between said guide wheel and said line wheel being spaced, by virtue of the inclination of said axis, from the portion of said line which depends from said line wheel.

LOUIS Q. WEBBER.

References Cited in the file of this patent

UNITED STATES PATENTS

| Number | Name | Date |
|---|---|---|
| 1,572,719 | Hazlett | Feb. 9, 1926 |
| 1,692,057 | Smith | Nov. 20, 1928 |
| 1,700,336 | Redfield | Jan. 29, 1929 |
| 1,848,489 | Motherwell | Mar. 8, 1932 |
| 1,869,909 | Norwood | Aug. 2, 1932 |
| 2,131,868 | Bolton et al. | Oct. 4, 1938 |
| 2,311,762 | Kottmann et al. | Feb. 23, 1943 |
| 2,349,228 | Wolff | May 16, 1944 |
| 2,353,249 | Lebourg | July 11, 1944 |